June 11, 1968  A. WINKLER ET AL  3,387,546
TAKE-UP FOR PHOTOGRAPHIC CAMERAS
Filed May 3, 1965  3 Sheets-Sheet 1
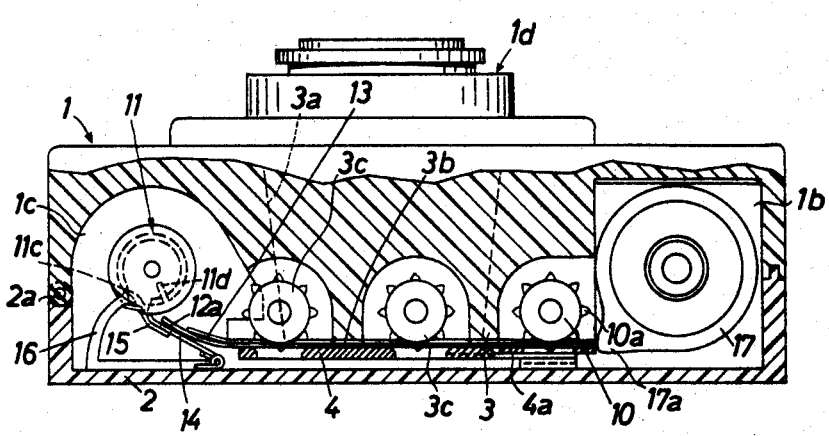
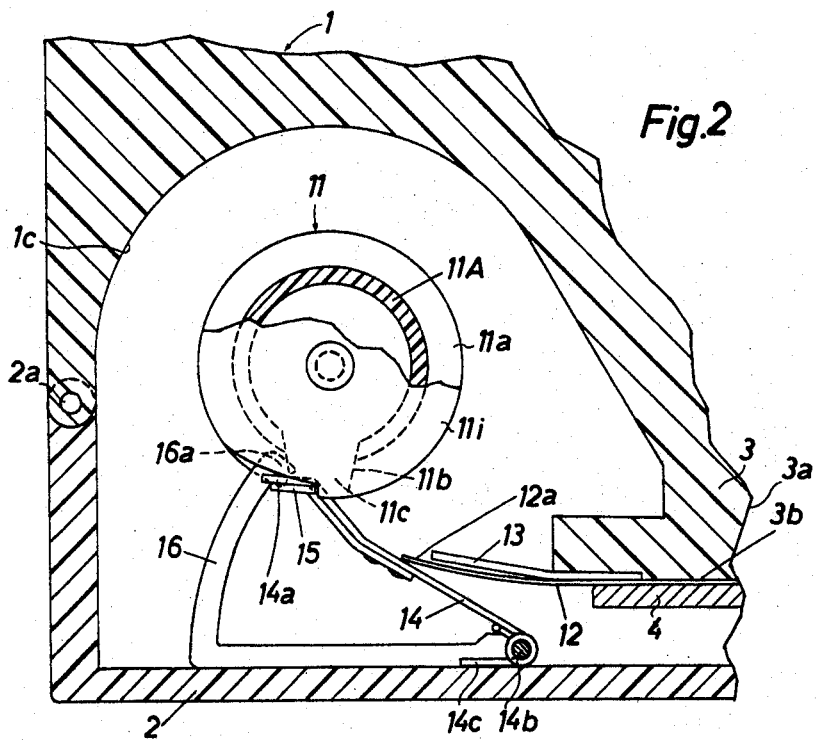
INVENTORS:
ALFRED WINKLER
HEINRICH STIERSTORFER
HEINZ ERNST
BY Michael J. Striker
their ATTORNEY

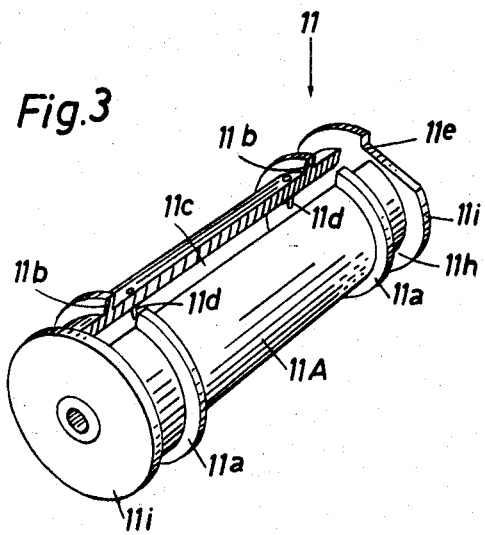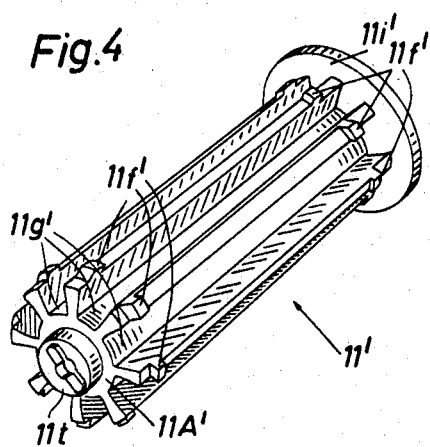

June 11, 1968  A. WINKLER ET AL  3,387,546
TAKE-UP FOR PHOTOGRAPHIC CAMERAS
Filed May 3, 1965  3 Sheets-Sheet 3
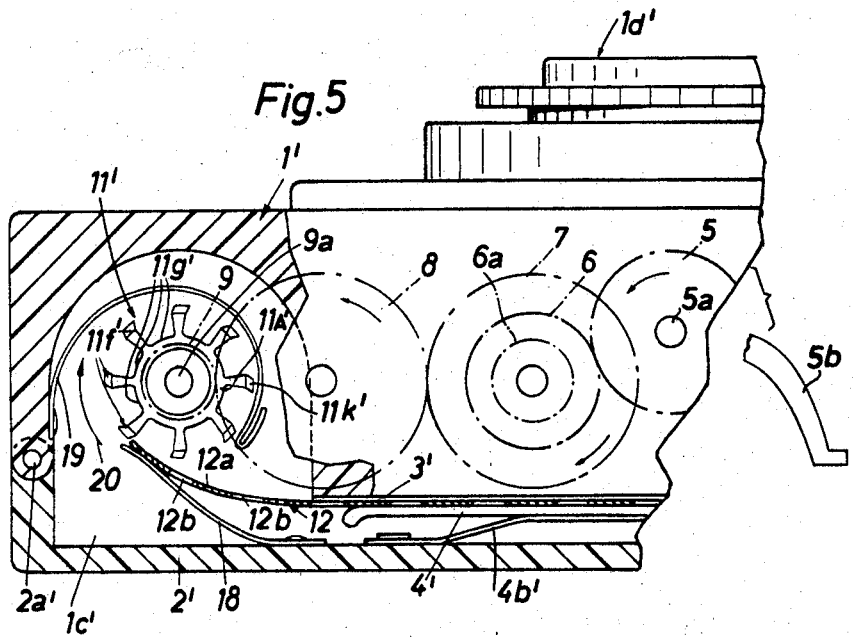
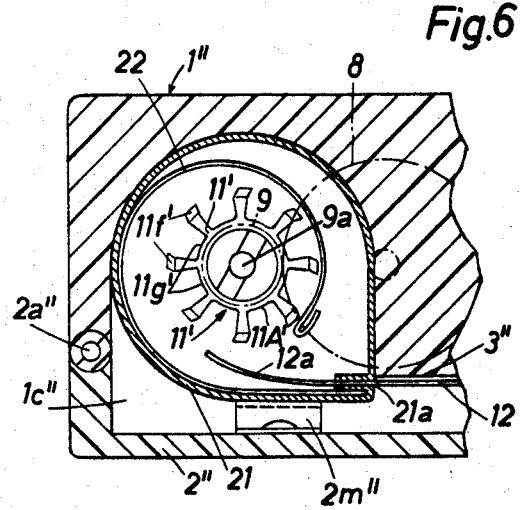
INVENTORS:
ALFRED WINKLER
HEINRICH STIERSTORFER
HEINZ ERNST
BY Michael J. Striker
their ATTORNEY United States Patent Office 3,387,546
Patented June 11, 1968

3,387,546
TAKE-UP FOR PHOTOGRAPHIC CAMERAS
Alfred Winkler, Heinz Ernst, and Heinrich Stierstorfer, Munich, Germany, assignors to Agfa Aktiengesellschaft, Leverkusen, Germany
Filed May 3, 1965, Ser. No. 452,580
Claims priority, application Germany, June 2, 1964, A 46,189
11 Claims. (Cl. 95—31)

ABSTRACT OF THE DISCLOSURE

A photographic camera wherein the take-up spool is rotated by the film transportaing mechanism and has teeth which enter perforations at the leading end of the film to convolute the film around the spool in response to actuation of the film transporting mechanism. The spool has a recess which receives the leading end of the film and the housing of the camera is provided with devices which deflect the leading end of the film into the recess and move the perforations in the leading end into the range of teeth on the spool.

The present invention relates to photographic cameras for use with perforated photographic film, and more particularly to an improved take-up device for such cameras. Still more particularly, the invention relates to improvements in photographic cameras of the type wherein the leading end of a perforated film is automatically coupled to the take-up device.

It is known to construct still cameras in such a way that the take-up spool which collects film issuing from the supply cartridge is driven by the film transporting mechanism. The take-up spool is provided with hooks whose purpose is to engage the leading end of the film and to thereby couple the film to the take-up device. However, it was found that such take-up devices often fail to properly engage the leading end of the film so that, when the transporting mechanism is set in operation, the film forms a series of loose loops which fill the corresponding chamber of the camera housing or the take-up cartridge before the entire film is withdrawn from the supply cartridge. In other words, such take-up devices are not sufficiently reliable because the user is never sure that the leading end of the film is actually coupled to the driven spool of the take-up device.

Accordingly, it is an important object of the present invention to provide a simple, compact and highly reliable take-up device for perforated photographic film and to construct the take-up device in such a way that the leading end of the film is automatically and invariably coupled to the revolving part of the take-up device as soon as the film is properly engaged and advanced by the transporting mechanism which serves to withdrawn the film from the supply cartridge.

Another object of the invention is to provide an improved rotor or spool which may be utilized in such take-up devices and to construct the rotor in such a way that it may be readily coupled with or detached from the film transporting mechanism of a photographic camera.

A further object of the invention is to provide an improved deflecting or directing unit or assembly which may be used in such photographic camera to compel the leading end of a perforated film to move into requisite position for engagement by the revolving spool of the take-up device.

Still another object of the invention is to provide a take-up device of the above outlined characteristics which is capable of rolling up the film in a series of closely adjacent convolutions so that the chamber which accommodates the cartridge and/or the rotor of the take-up device can accommodate the full length of a film which is stored in and intermittently withdrawn from the supply cartridge.

Another object of the invention is to provide an improved driving connection between the film transporting mechanism and the rotary part or parts of the take-up device.

A concomitant object of the invention is to provide a take-up device which is capable of subjecting the film to requisite tension to make sure that the film lies flat in that portion of its path which is located behind the objective of a photographic camera and to simultaneously insure that the film is wound tightly around the rotary part of the take-up device.

A further object of the instant invention is to provide a photographic camera wherein the take-up device is constructed, assembled and mounted in such a way that its rotary part is released for rotation in response to operation of the film transporting mechanism only at a time when the leading end of the film is in an optimum position for engagement by and for attachment to the rotary part of the take-up device and wherein such release of the rotary part is effected by the film.

Still another object of the present invention is to provide a take-up device which can be used for collecting photographic film of the type having one or two rows of perforations and to construct the take-up device in such a way that all of its parts can be readily accommodated in the customary film-collecting chamber of a photographic camera.

Briefly stated, one feature of our present invention resides in the provision of a still camera for use with photographic film of the type having at least one row of perforations extending along one of its longitudinal edges. The camera comprises a housing defining a pair of spaced chambers located at the opposite sides of the optical axis, a film supply cartridge or another suitable source of film removably accommodated in one of the chambers, guide means preferably including at least one idler sprocket for guiding the film between the two chambers, take-up means including a rotor mounted in the other chamber and having at least one axially extending recess or cutout whose length at least equals the width of the foremost part of the film, at least one tooth flank provided on the rotor ahead of the recess (as seen in the direction in which the rotor must rotate to convolute the film thereabout), and a transporting mechanism for advancing the film between the chambers and for driving the rotor in a direction to wind the film therearound. The camera preferably also comprises deflecting means for directing the foremost part of the film into the recess and for moving the perforations on the leading end of the film into the range of the tooth flank. Such deflecting means may comprise one or more leaf springs which may be mounted on a rear wall of the housing or in a take-up cartridge which is removably inserted into the other chamber and accommodates the rotor. The take-up cartridge has a mouth through which the film is caused to advance on its way into the range of the tooth flank.

The novel features which are considered as characteristic of the invention are set forth in particular in the appended claims. The improved photographic camera itself, however, both as to its construction and its mode of operation, together with additional features and advantages thereof, will be best understood upon persual of the following detailed description of certain specific embodiments with reference to the accompanying drawings, in which:

FIG. 1 is a top plan view of a still camera comprising a take-up device which is constructed and assembled in accordance with a first embodiment of our invention, a portion of the top wall of the camera housing and certain elements of the film transporting mechanism being broken away;

FIG. 2 is an enlarged view of the left-hand portion of the structure shown in FIG. 1, with a portion of the take-up device broken away;

FIG. 3 is a perspective view of the take-up device shown in FIGS. 1 and 2;

FIG. 4 is a perspective view of a modified take-up device;

FIG. 5 is a fragmentary top plan view of a still camera which embodies the take-up device of FIG. 4, the top wall of the camera housing being partly broken away; and FIG. 6 is a fragmentary horizontal section through another still camera wherein the take-up device comprises a cartridge.

Referring first to FIGS. 1 to 3, there is shown a still camera which comprises a housing 1 having a rear wall 2 which is hinged to the remainder of the housing, as at 2a, and may be moved to and from the sealing or closed position illustrated in FIG. 1 or 2. The housing 1 defines two chambers 1b, 1c which are located at the opposite sides of the objective 1d, and these chambers are readily accessible when the rear wall 2 is swung from the sealing position of FIGS. 1 and 2 to an open position. The chamber 1b accommodates a removable supply cartridge 17 whose mouth 17a is immediately adjacent to a sprocket 10 forming part of the film transporting mechanism which will be described later. The teeth 10a of the sprocket 10 enter consecutive perforations along both longitudinal edges of the film 12 and, when the sprocket 10 is driven in a clockwise direction, as viewed in FIG. 1, the film 12 is advanced through a narrow channel extending in front of the rear wall 2 so that its leading end 12a enters the chamber 1c. The guide means for guiding that length of the film 12 which extends between the chambers 1b and 1c comprises a frame 3 which defines an opening 3a adapted to admit light from the viewed scene or object to that portion of the film 12 which is directly adjacent to the flat rear face 3b of the frame 3. The aforementioned guide means further comprises one or more pressing plates which are secured to the rear wall 2. In the embodiment of FIGS. 1 and 2, the camera comprises two pressing plates including a large pressing plate 4 which is located behind the frame 3 and a small pressing plate 4a which is located behind the sprocket 10. The two pressing plates are biased by suitable spring means (not shown) and are preferably coupled to each other in such a way that each plate is movable relative to the other plate. One or more idler sprockets 3c are mounted in the frame 3 and their teeth enter consecutive perforations of the film 12 to prevent lateral displacement of that length of film which is located in front of the pressing plate 4. The exact construction, mounting and purpose of idler sprockets 3c is described in our copending application Ser. No. 450,127, filed Apr. 22, 1965, entitled "Photographic Camera," and now abandoned.

The film transporting mechanism of the camera shown in FIG. 1 comprises a knob, a lever or a similar manually operable actuating member which drives a train of gears (to be described in connection with FIG. 5) in such a way that the sprocket 10 advances the film 12 at a speed which is less than the maximum rotational speed of a rotor or spool 11 mounted in the chamber 1c, provided that the leading end 12a of the film 12 is not as yet connected to the rotor 11. The operative connection between the actuating member and the rotor 11 comprises a friction clutch or another suitable slip clutch which allows the rotor to slip so that its peripheral speed will equal the forward speed of the film 12 when the leading end 12a is properly attached to and is being convoluted around the rotor. The slip clutch enables the rotor to maintain the film 12 under tension and this clutch also insures that the film forms a series of tight convolutions around the rotor.

As best shown in FIGS. 2 and 3, the rotor 11 comprises a hollow cylinder or core 11A which is provided with two radially outwardly extending collars 11a each adjacent to but still spaced from the respective end of the cylinder. These collars are coplanar with the rows of perforations along the respective longitudinal edges of the film 12. Each end of the cylinder 11A carries a disk-shaped flange 11i and the cylinder 11A is also provided with an axially extending recess 11c. As a rule, the length of the recess 11c at least equals the width of the film 12. In the embodiment of FIGS. 1 to 3, the recess 11c is actually a cutout which allows the foremost part of the leading end 12a of the film 12 to extend into the interior of the hollow cylinder 11A. This cutout 11c is located past a pair of tooth flanks 11b provided on the collars 11a, as seen in the (clockwise) direction in which the cylinder 11A must rotate in order to convolute the film 12 around the rotor 11, and such tooth flanks 11b are formed by radial faces of the collars 11a. The interior of the cylinder 11A accommodates two stop pins 11d which extend into the path of the foremost part of the leading end 12a when the latter is caused to enter through the cutout 11c whereby, in response to continued advance of the film along the pressing plates 4, 4a and into the chamber 1c, the leading end 12a forms a loop and the flanks 11b enter the nearest perforations to thereby couple the film 12 to the rotor 11. Such looping or bulging of the film 12 is due to the fact that the rotor 11 is held against rotation until such time when the flanks 11b have actually entered the nearest perforations in the leading end 12a. The means for temporarily holding the rotor 11 against rotation comprises a leaf spring 14, best shown in FIG. 2 and forming part of a deflecting unit which serves to direct the foremost part of the leading end 12a into the cutout 11c and to thus advance the perforations of the film 12 into the range of the tooth flanks 11b. The leaf spring 14 is hinged to the rear wall 2, as at 14b, and its free end carries a pawl 14a which normally extends into a notch 11e provided in the adjacent flange 11i of the rotor 11. When the film 12 is to be convoluted around the cylinder 11A, the rotor 11 is driven in a clockwise direction, as viewed in FIGS. 1 to 3. The notched flange 11i actually constitutes a ratchet-like portion of the rotor 11 and cooperates with the pawl 14a on the leaf spring 14 in such a way that the cutout 11c is located in the path of the foremost part of the leading end 12a of the film 12 so that such foremost part comes into abutment with the stop pins 11d and causes the leading end 12a to bulge so as to move two of its perforations into the range of the tooth flanks 11b. At the same time, the thus deformed or bulged portion of the leading end 12a bears against a portion of the spring 14 and causes it to rock about the axis of the hinge 14b so that the pawl 14a is withdrawn from the notch 11e and the transporting mechanism is free to rotate the cylinder 11A in a clockwise direction. When the pawl 14a extends into the notch 11e and when the actuating member of the film transporting mechanism is operated by hand in a sense to advance the leading end 12a into the chamber 1c, the aforementioned slip clutch allows the actuating member to drive the sprocket 10 while the rotor 11 remains stationary. However, as soon as the looped leading end 12a disengages the pawl 14a from the corresponding flange 11i, the slip clutch tends to drive the rotor 11 at a speed which exceeds the speed of the sprocket 10 so that the tooth flanks 11b cause the film 12 to form a series of tight convolutions around the cylinder 11A.

In addition to the spring 14, the deflecting unit of the camera shown in FIGS. 1 and 2 comprises a second leaf spring 13 which is mounted on the frame 3 and cooperates with the spring 14 to define therewith a narrow gap through which the leading end 12a of the film 12 advances in a direction toward the cutout 11c and into engagement with the flanks 11b. The spring 14 could be replaced by a rigid arm or the like because the deflecting unit preferably comprises a torsion spring 14c which is convoluted around the pintle of the hinge 14b and tends to rock the spring 14 in a clockwise direction, as viewed in FIGS. 1 and 2. A blocking or arresting lever 16 is attached to the rear wall 2 and its hooked nose 16a extends into an annular groove 11h (see FIG. 3) between the right-hand collar 11b and the right-hand flange 11i when the rear wall 2 is pivoted to sealing position. The nose 16a of the blocking lever 16 is located in the path of a laterally extending lug 15 at the free end of the spring 14 and prevents this spring from penetrating too far into the interior of the chamber 1c when the rotor 11 is removed from this chamber.

The operation of the camera shown in FIGS. 1 to 3 is as follows:

In order to insert a fresh film supply cartridge 17, the user opens the rear wall 2 and inserts the cartridge into the chamber 1b in such a way that the mouth 17a is closely adjacent to the sprocket 10 and that the leading end 12a of the film 12 overlies the teeth 10a of this sprocket. The rear wall 2 is then returned to closed or sealing position whereby the pressing plate 4a insures that the leading end 12a remains attached to the sprocket 10 because at least one tooth 10a of this sprocket extends through the adjoining perforation in the leading end 12a. If the user thereupon rotates the sprocket 10 by means of an actuating lever or the like in a sense that the sprocket is driven in a clockwise direction, the leading end 12a of the film 12 will pass along the front face of the pressing plate 4, through the gap between the deflecting springs 13, 14, and directly toward the cutout 11c in the cylinder 11A of the rotor 11. This is due to the fact that the rotor 11 cannot rotate in response to actuation of the transporting mechanism because, in response to clockwise rotation of the cylinder 11A through less than one full revolution, the pawl 14a of the spring 14 will enter the notch 11e and will arrest the rotor 11 until the pawl 14a is disengaged in response to looping or buckling of the leading end 12a after the foremost part of this leading end comes into abutment with the stop pin 11d. The looped part of the leading end 12a moves into the range of the tooth flanks 11b which enter the nearest perforations and, as soon as the pawl 14a is expelled from the notch 11e, the cylinder 11A is free to rotate in response to continued operation of the actuating lever to entrain the leading end 12a and to wind it around the rotor 11, i.e., such leading end 12a then forms one or more tight convolutions around the collars 11a. The film transporting mechanism is operated intermittently immediately prior to an exposure or after each exposure so that, ultimately, the entire film 12 is coiled around the rotor 11. The operator then rewinds the film onto the core of the supply cartridge 17 in the chamber 1b and opens the rear wall 2 so that the cartridge 17, now containing the exposed film, can be withdrawn from the housing 1 to be replaced by a fresh film supply cartridge. When the rear wall 2 is moved to open position, the spring 14c urges the pawl 14a to pivot in a clockwise direction, as viewed in FIG. 2, but the nose 16a of the blocking lever 16 extends into the path of the lug 15 and holds the spring 14 in an optimum position for reentry of the pawl 14a into the notch 11e when the rear wall 2 returns to sealing position. The purpose of the blocking lever 16 is to protect the spring 14 from damage or excessive deformation when the rear wall 2 is closed and/or when the rotor 11 is inserted into or withdrawn from the chamber 1c. As shown in FIG. 1, the stop pins 11d may extend radially inwardly from the internal surface of the cylinder 11A so that the foremost part of the leading end 12a may form a little less than a full convolution in the interior of the cylinder before the adjoining portion of the leading end 12a begins to buckle and to disengage the pawl 14a from the corresponding flange 11i.

FIGS. 4 and 5 illustrate a portion of a modified still camera whose housing 1' accommodates a different takeup device including a rotor 11' having two annuli or groups of teeth 11f'. Each tooth 11f' in one of the groups adjacent to one axial end of the rotor 11' is in axial alignment with one tooth 11f' of the other group. The plane of each group of teeth coincides with the plane of one row of perforations 12b in the film 12, i.e., each tooth 11f' registers with one row of such perforations. The rear wall 2' is hinged to the remainder of the housing 1', as at 2a', and carries one or more pressing plates 4' which cooperate with the frame 3' in the same way as described in connection with FIG. 1 and are biased by one or more leaf springs 4b'. The deflecting unit of the camera shown in FIG. 5 comprises a first leaf spring 18 which replaces the spring 14 and directs the leading end 12a into the range of the teeth 11f'. It will be seen that each tooth 11f' comprises a tip or hook 11k' which extends in the direction (see the arrow 20) in which the cylinder 11A' of the rotor 11' must be driven in order to wind the film 12. The deflecting unit further comprises an arcuate leaf spring 19 which is fixed to the housing 1' and extends with clearance around the rotor 11'.

The film transporting mechanism of the camera shown in FIG. 5 comprises a gear train including a first gear 5 whose shaft 5a may be rotated by an actuating lever 5b so that the gear 5 will be driven in a counterclockwise direction. The gear 5 meshes with a gear (not shown) which is secured to the shaft of the sprocket 10 (see FIG. 1) so that the sprocket 10 will rotate in a clockwise direction when the gear 5 rotates in a counterclockwise direction. The gear 5 also meshes with a first intermediate gear 6 which can drive a second intermediate gear 7 through a friction clutch or slip clutch 6a of any known construction. The gear 7 meshes with a third intermediate gear 8 which in turn meshes with a driver gear 9 mounted on a shaft 9a which is detachably coupled to the rotor 11'. The arrows shown in FIG. 5 indicate the directions in which the intermediate gears 6–8 must rotate in order to drive the rotor 11' in a clockwise direction (arrow 20).

When the lever 5b is turned by hand so as to rotate the gear 5 in a counterclockwise direction, the sprocket 10 rotates in a clockwise direction and causes the leading end 12a of the film 12 contained in a freshly inserted supply cartridge 17 to advance along the guide means including the pressing plate 4' and the frame 3' and to move along the concave side of the deflecting spring 19 which directs the foremost part of the leading end 12a into the range of the hooked tips 11k' of the teeth 11f' whereby the front flanges of such teeth enter the corresponding perforations 12b and entrain the leading end 12a into the interior of the loop formed by the second deflecting spring 19. Since the transmission ratio of the gear train 5–9 forming part of the film transporting mechanism is such that the rotor 11' tends to rotate at a speed which exceeds the speed of the sprocket 10, the film 12 is wound tightly around the cylinder 11A'. Any slippage which is necessary to prevent tearing of the film 12 is due to the provision of the clutch 6a.

The rotor 11' is formed with a large number of recesses 11g', one for each pair of teeth 11f'. Such recesses are provided past the respective pairs of axially aligned teeth 11f', as seen in the direction indicated by the arrow 20, and it will be noted that the spring 18 is configurated in such a way that its left-hand portion actually deflects the foremost part of the leading end 12a into the nearest cutout 11g' whereby the forwardly bent tips 11k' of the teeth 11f' automatically find their way into the adjoining perforations 12b and the front flanks of such teeth entrain the film 12 whenever the lever 5b is operated by hand in a sense to rotate the cylinder 11A' in a clockwise direction. During rewinding of the film back into the supply spool 17, the leading end 12a is automatically disengaged from the rotor 11'.

The blocking lever 16 of FIG. 1 can be omitted in the camera of FIG. 5 because the free end of the deflecting spring 18 need not come too close to the teeth 11f' of the rotor 11'. The other deflecting spring 19 assists the teeth 11f' in forming a series of tight convolutions so that the cylinder consisting of such convolutions is of truly circular cross section.

The camera of FIG. 6 comprises a housing 11" whose chamber 1c" accommodates a modified take-up device including a film-collecting cartridge or magazine 21 having a mouth 21a through which the leading end 12a of the film 12 enters when the sprocket 10 (not shown) is driven by the lever 5b in the same way as described in connection with FIG. 5. The intermediate gear 8 and the driver gear 9 shown in FIG. 6 form part of the transporting mechanism and operate in the same way as described above.

The rotor 11' is mounted in the interior of the cartridge 21, and this cartridge is held in requisite position by a locating member or cam 2m" provided at the inner side of the rear wall 2" which is hinged at 2a". The deflecting spring 18 of FIG. 5 has been omitted but the spring 19 is replaced by a deflecting spring 22 which is mounted in the mantle of the take-up cartridge 21 and directs the leading end 12a into the range of the teeth 11f'. The foremost part of the leading end 12a will enter one of the recesses 11g'.

A very important advantage of the take-up device shown in FIG. 6 is that the exposed film need not be rewound into the supply cartridge, i.e., the entire film may be coiled up in the cartridge 21, and this cartridge is then removed to be replaced by a fresh take-up cartridge. In other words, the camera need not be provided with a backwind mechanism. The rotor 11' of FIG. 6 is detachably coupled to the shaft 9a of the driver gear 9 so that the cartridge 21 may be readily removed from the chamber 1c". The male portion of the coupling between the rotor 11' and the transporting mechanism is shown at 11t in FIG. 4.

It is clear that the cartridge 21 of FIG. 6 may contain a rotor of the type shown in FIG. 3 without in any way departing from the spirit of our invention. It is also clear that the cartridge 21 may accommodate two or more deflecting springs which will insure, with even greater certainty, that the leading end 12a of the film 12 is automatically coupled to the rotor 11 or 11' when the transporting mechanism is operated after the leading end 12a advances through the mouth 21a.

Many other modifications of the improved take-up device will readily occur to persons skilled in this art upon perusal of the preceding disclosure. For example, the recesses 11g' in the rotor 11' of FIGS. 4–6 may be replaced by cutouts similar to the cutout 11c of the rotor 11 so that the leading end 12a of the film could penetrate into the interior of the cylinder 11A'. Analogously, the cutout 11c of the rotor 11 could be replaced by a recess similar to one of the recesses 11g'; in such cameras, the leading end 12a of the film 12 will bulge when it reaches the bottom of the recess in the rotor 11A. Also, the flanges 11i and 11i' may be omitted if the rotor 11 or 11' is mounted in a film-collecting cartridge 21 as shown in FIG. 6. Also, the rotor 11 may be provided with a single flange 11i, and the rotor 11' may be produced without the single flange 11i' even if this rotor 11' is not installed in a cartridge. It is also clear that the deflecting spring 14 shown in FIGS. 1 and 2 could be constructed and mounted in such a way that its pawl 14a would cooperate with the cutout 11c or with one of the recesses 11g' so that the notch 11e may be dispensed with. Finally, the rotor 11' could be formed with straight teeth 11f', with a lesser or larger number of teeth 11f', or with teeth of different length. All such modifications are so obvious that each thereof can be readily understood without necessitating any further illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptation should and are intended to be comprehended within the meaning and range of equivalence of the following claims.

What is claimed as new and desired to be secured by Letters Patent is:

1. In a camera for photographic film of the type having at least one row of perforations, a housing defining a pair of chambers; a source of film in one of said chambers; guide means for guiding the film between said chambers; take-up means comprising a rotor mounted in the other chamber and having at least one tooth flank registering with the row of perforations and arranged to enter a perforation in the leading end of that length of film which extends between said chambers and to convolute the film around said rotor when the latter is driven in a predetermined direction, said rotor further having a recess located past said flank and arranged to accommodate the foremost part of the film; and transporting means for conveying the film from said source to said other chamber and for rotating the rotor in said predetermined direction, said transporting means comprising a drive shaft and means for detachably coupling said drive shaft to said rotor so that the rotor may be withdrawn from said other chamber.

2. In a camera for photographic film of the type having at least one row of perforations, a housing defining a pair of chambers; a source of film in one of said chambers; guide means for guiding the film between said chambers; take-up means comprising a rotor mounted in the other chamber and having at least one tooth flank registering with the row of perforations and arranged to enter a perforation in the leading end of that length of film which extends between said chambers and to convolute the film around said rotor when the latter is driven in a predetermined direction, said rotor further having a recess located past said flank and arranged to accommodate the foremost part of the film and a ratchet-like portion; transporting means for conveying the film from said source to said other chamber and for rotating the rotor in said predetermined direction, comprising actuating means and slip clutch means disposed between said actuating means and said rotor; and deflecting means for directing the foremost part of the film into the range of said tooth flank, comprising a spring having a pawl normally engaging said ratchet-like portion of said rotor to hold the rotor against rotation in said predetermined direction whereby said clutch means disconnects the rotor from said actuating means and the film is transported toward said rotor when the actuating means is operated while the pawl engages said ratchet-like portion, said spring being located in the path of the leading end of the film so that the film can disengage the pawl from said rotor when said tooth flank enters a perforation whereby said clutch means is free to drive said rotor in response to continued operation of said actuating means.

3. In a camera for photographic film of the type having at least one row of perforations, a housing defining a pair of chambers and having a rear wall movable with reference to the remainder of the housing to respectively expose or seal said chambers; a source of film in one of said chambers; guide means for guiding the film between said chambers; take-up means including a rotor mounted in the other chamber and having at least one tooth flank registering with the row of perforations and arranged to enter a perforation in the leading end of that length of film which extends between said chambers and to convolute the film around said rotor when the latter is driven in a predetermined direction, said rotor further having a recess located past said flank, as seen in said predetermined direction, and arranged to accommodate the foremost part of the film; transporting means for conveying the film from said source to said other chamber and for rotating said rotor in said predetermined direction; deflecting means comprising a spring biased member extending into said other chamber for directing the foremost part of the film into the range of said flank; and blocking means fixed to said rear wall and engaging said spring biased member to hold the same in requisite position with reference to said rotor.

4. A structure as set forth in claim 3, wherein said rotor has a circumferential groove and wherein said blocking means comprises a lever having an end portion extending into said groove when the rear wall seals said chambers.

5. In a camera for photographic film of the type having at least one row of perforations, a housing defining a pair of chambers; a source of film in one of said chambers; guide means for guiding the film between said chambers; take-up means including a hollow rotor mounted in the other chamber and having at least one tooth flank registering with the row of perforations and arranged to enter a perforation in the leading end of that length of film which extends between said chambers and to convolute the film around said rotor when the latter is driven in a predetermined direction, said rotor further having a cutout located past said flank, as seen in said predetermined direction, and arranged to accommodate the foremost part of the film; stop means located in said rotor to limit the extent of penetration of the foremost part of the film whereby the film forms a loop and one of its perforations moves into the range of said flank in response to continued advance of film toward said other chamber; and transporting means for conveying the film from said source to said other chamber and for rotating the rotor in said predetermined direction.

6. In a camera for photographic film of the type having at least one row of perforations, a housing defining a pair of chambers and having a rear wall movable with reference to the remainder of the housing to respectively expose or seal said chambers; a source of film in one of said chambers; guide means for guiding the film between said chambers; take-up means including a rotor mounted in the other chamber and having at least one tooth flank registering with the row of perforations and arranged to enter a perforation in the leading end of that length of film which extends between said chambers and to convolute the film around said rotor when the latter is driven in a predetermined direction, said rotor further having a recess located past said flank, as seen in said predetermined direction, and arranged to accommodate the foremost part of the film; transporting means for conveying the film from said source to said other chamber and for rotating said rotor in said predetermined direction; and deflecting means mounted on said rear wall and comprising a spring-biased deflecting member extending into said other chamber for directing the foremost part of the film into the range of said flank.

7. In a camera for photographic film of the type having two rows of perforations, a housing defining a pair of chambers; a source of film in one of said chambers; guide means for guiding the film between said chambers; take-up means including a rotor mounted in the other chamber and having two aligned axially spaced tooth flanks each registering with one row of perforations and arranged to enter a perforation of the respective row in the leading end of that length of film which extends between said chambers and to convolute the film around said rotor when the latter is driven in a predetermined direction, said rotor further having an elongated recess located past said flanks as seen in said predetermined direction, and arranged to accommodate the foremost part of the film; and transporting means for conveying the film from said source to said other chamber and for driving said rotor in said predetermined direction, said transporting means comprising a sprocket having teeth extending into consecutive perforations of that length of film which is withdrawn from said source for advancing such length of film at a first speed, drive means for driving said rotor at a peripheral speed which is higher than said first speed, actuating means for rotating said drive means and said sprocket, and slip clutch means interposed between said actuating means and said drive means.

8. A structure as set forth in claim 7, wherein said rotor comprises two groups of teeth each registering with one row of perforations and each tooth of one group being in axial alignment with a tooth of the other group, said flanks being provided on said teeth and said rotor further having a recess located past each pair of axially aligned teeth.

9. In a camera for photographic film of the type having at least one row of perforations, a housing defining a pair of chambers; a source of film in one of said chambers; guide means for guiding the film between said chambers; take-up means comprising a film-collecting cartridge received in the other chamber and having a mouth through which the film may enter the interior of said cartridge, a rotor mounted in said cartridge and having at least one tooth flank registering with the row of perforations and arranged to enter a perforation in the leading end of that length of film which extends between said chambers and is fed through the mouth of said cartridge when the rotor is driven in a predetermined direction, said rotor further having an elongated recess located past said flank, as seen in said predetermined direction, and arranged to accommodate the foremost part of the film; and transporting means for conveying the film from said source to said other chamber and through the mouth of said cartridge and for driving the rotor in said predetermined direction.

10. A structure as set forth in claim 9 further comprising deflecting means provided in said cartridge for directing the leading end of the film into the range of said tooth flank.

11. A structure as set forth in claim 10, wherein said deflecting means comprises at least one leaf spring.

References Cited

UNITED STATES PATENTS

| | | | |
|---|---|---|---|
| 3,193,210 | 7/1965 | Hampl | 352—158 XR |
| 3,233,839 | 2/1966 | Reinsch | 352—158 XR |

FOREIGN PATENTS

| | | |
|---|---|---|
| 217,844 | 10/1961 | Austria. |
| 1,357,851 | 3/1964 | France. |
| 866,600 | 6/1953 | Germany. |

NORTON ANSHER, *Primary Examiner.*

JOSEPH F. PETERS, *Assistant Examiner.*